(12) United States Patent
Kim et al.

(10) Patent No.: US 8,416,254 B2
(45) Date of Patent: Apr. 9, 2013

(54) APPARATUS AND METHOD FOR PROVIDING ENHANCED VISIBILITY IN MOBILE TERMINAL

(75) Inventors: Jong-Man Kim, Ansan-si (KR); Sung-Dae Cho, Yongin-si (KR); Min-Kyu Park, Seoul (KR); Yun-Je Oh, Yongin-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 595 days.

(21) Appl. No.: 12/348,930

(22) Filed: Jan. 6, 2009

(65) Prior Publication Data

US 2009/0174725 A1   Jul. 9, 2009

(30) Foreign Application Priority Data

Jan. 7, 2008   (KR) .................. 10-2008-0001761

(51) Int. Cl.
*G09G 5/02* (2006.01)
(52) U.S. Cl. ....................... 345/590; 345/426
(58) Field of Classification Search .................. 345/590
See application file for complete search history.

(56) References Cited

U.S. PATENT DOCUMENTS

| | | | |
|---|---|---|---|
| 2001/0035989 A1* | 11/2001 | Takemoto | 358/518 |
| 2002/0027566 A1* | 3/2002 | Naka et al. | 345/696 |
| 2003/0122845 A1* | 7/2003 | Lee et al. | 345/589 |
| 2003/0214242 A1* | 11/2003 | Berg-johansen | 315/169.3 |
| 2005/0024538 A1* | 2/2005 | Park et al. | 348/602 |
| 2006/0119870 A1* | 6/2006 | Ho et al. | 358/1.9 |
| 2008/0062483 A1* | 3/2008 | Morimoto | 358/530 |

* cited by examiner

*Primary Examiner* — Said Broome
*Assistant Examiner* — Peter Hoang
(74) *Attorney, Agent, or Firm* — Cha & Reiter, LLC

(57) ABSTRACT

A screen display apparatus and method of measuring an ambient brightness by adjusting color quality of an output screen in a mobile terminal according to the ambient brightness, so that the visibility of the screen can be ensured in various environments. The includes measuring an ambient brightness of the mobile terminal, and generating a visibility adjustment event when a measured ambient brightness value is equal to or greater than a preset specific external brightness value. The received RGB signal is converted into first tristimulus values, then to L, a, b color space valueslightness (L), chroma (C), and hue (H) values using a predetermined equation. The brightness of an entire region of the image is adjusted and output on the display screen of the mobile terminal, and the chroma of each pixel region is adjusted by using the L, C, and H values.

19 Claims, 3 Drawing Sheets

APPARATUS AND METHOD FOR PROVIDING ENHANCED VISIBILITY IN MOBILE TERMINAL

CLAIM OF PRIORITY

This application claims the benefit under 35 U.S.C. §119 (a) of a Korean Patent Application filed in the Korean Intellectual Property Office on Jan. 7, 2008 and assigned Serial No. 10-2008-0001761, the entire disclosure of which is hereby incorporated by reference in its entirety.

BACKGROUND OF THE INVENTION

1. Field of the Invention

The present invention relates to enhancing color reproducibility in an imaging device. More particularly, the present invention relates to an enhancing visibility of an image output on a display unit of a mobile terminal when viewed outdoors.

2. Description of the Related Art

Recently, a variety of digital devices that meet the diverse needs of consumers have come into wide use. These digital devices can range from those having large-sized displays, such as computers and digital televisions (TVs), to those having small-sized displays, such as mobile phones, personal digital assistants (PDAs), and portable multimedia players (PMPs).

Unlike large-sized digital devices, small-sized digital devices, such as mobile phones, can be used both fixed settings, and in various locations with a range of ambient conditions, such as in dark rooms or in outdoor environments under direct sunlight. Therefore, there is a long-felt need in the art to develop a method of optimally displaying an image by providing appropriate brightness and contrast of an image displayed under a given external luminance. For example, when an external luminance is high, the brightness and contrast of the displayed image must be increased.

However, there are difficulties in determining how to adjust the lightness and the contrast of a displayed image according to changes in external luminance. The same is true for adjustment of the chroma of the displayed image according to such changes in the brightness and the contrast. Accordingly, various technologies for solving the visibility deterioration problem in digital devices, including displays, according to external luminance information have been proposed without success.

Meanwhile, a user may change the lightness of a display device according to external illumination while watching images displayed by the display device. In this case, the visibility of images displayed by the display device may deteriorate because the change of the lightness of the display device does not reflect various image properties, e.g. lightness, luminance, contrast, chroma, etc., that affect the visibility of the display device. Also, when the lightness of the display device is changed, the power consumption of a display device is rarely taken into consideration. When the recent tendency for many image display devices to be compact-sized and portable is considered, it is highly important to develop image display devices that can ensure the visibility of images while consuming less power.

In many cases, mobile terminals are typically used outdoors. When an ambient light is greater than a brightness (i.e. luminance or lightness) of the display unit of a mobile terminal, there occurs a drawback that visibility deteriorates enough to make it difficult for a user to identify an output screen of the display unit. When the display unit is a transmissive liquid crystal display (LCD) using only a backlight source as a light source, the drawback of visibility deterioration worsens due to a limitation in the brightness of the backlight used as the light source.

Since the conventional technologies of enhancing the brightness of the backlight cause large power consumption, they are unsuitable for mobile terminals or the like, which have a limitation in supplying power and are used mainly in outdoors environments, because most mobile terminals or the like use batteries as power sources.

The Commission International De L'Eclairage (CIE) is an international organization concerned with solving the above-mentioned problem. The CIE has proposed CIE tristimulus values based on an RGB function which is a function of three primary colors of light.

The RGB function may form at least one negative value. Therefore, when an imaging device is realized by using the RGB function, there are problems in that an algorithm is complicated and errors increase due to the negative value. In contrast, according to the tristimulus values based on XYZ, since negative values are converted into positive values and are then used, the problem of the RGB function can be solved. However, in the case of an LCD monitor used for a portable imaging device and having deteriorated luminance and chromaticity, in comparison with the conventional CRT, there is a problem in that large noise and distortion are caused during the quantization and the digital post-processing.

Another problem with the previously proposed solutions is that when a conversion curve is used in the RGB space, a chromaticity value may be changed. The RGB space is a color space in which it is difficult for one color to be continuously maintained. When a change is made to the same value, or when enhancement is made to a specific brightness, a chromaticity value is changed, so that a desired color cannot be maintained, which is a problem.

In comparison with the RGB space, the YUV space is effective in separately applying the chromaticity value and brightness, but has a disadvantage in that the uniformity is reduced. That is, when brightness increases by one, there must be an increase by the same level over all the sections. However, in reality, there is not such an increase throughout the sections. A space for solving such a problem is referred to as a CIELAB space (CIELAB being a mathematical derivative of CIE XYZ (1931) that describes colors using three synthetic primaries: L* (which indicates Lightness), a* (which indicates red-greenness), and b* (which indicates yellow-blueness)). The CIELAB space is also called an "equivalent visual coordinate system," and has a disadvantage in that the processing procedure is somewhat complex. The calculation procedure for processing the CIELAB is as follows.

Converting RGB Values into XYZ Tristimulus Values

First, after luminance and chromaticity values are measured with approximately 216 different color patches given to a display unit as an input, an estimation function is created, and XYZ values are estimated when certain RGB values are input.

Second, XYZ values are converted into Lab values by the following equation.

$$L^* = 116 \times (Y/Y_n)^{1/3} - 16$$

$$a^* = 500 \times ((X/X_n)^{1/3} - (Y/Y_n)^{1/3}) \, X_n Y_n Z_n:$$

$$b^* = 200 \times ((Y/Y_n)^{1/3} - (Z/Z_n)^{1/3}) \text{ white reference stimulus values}$$

Dividing Lab into Lightness, Chroma, and Hue $$C = \sqrt{a^2 + b^2}$$
$$H = \arctan\left(\frac{b}{a}\right)$$

The Lab value is used as an "L" value, without change.

Changing "L" in order to enhance lightness and changing "C" in order to enhance chroma However, the aforementioned methods requires a large amount of resources to be consumed when the RGB of an input image are converted into XYZ. Especially, in the case of a small-sized mobile display unit, since the same input does not result in the same luminance and chromaticity values, considerable measurement error is included, so that a problem is caused.

SUMMARY OF THE INVENTION

Accordingly, the present invention enhances color reproducibility in an imaging device, and more particularly, enhances the visibility in a mobile terminal by adjusting brightness (luminance) and chroma. The present invention functions to overcome a phenomenon where an image output on a display unit of a mobile terminal looks dark outdoors due to the light adaptation of the human visual system.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION

Hereinafter, an exemplary explanation of the present invention will be described with reference to the accompanying drawings. In the below description, many particular items such as a detailed component device are shown, but these are given only for providing the general understanding of the present invention. It will be understood by those skilled in the art that various changes in form and detail may be made within the scope of the present invention.

The present invention provides a screen display apparatus and method of measuring an ambient brightness, adjusting color quality of an output screen in a mobile terminal according to the ambient brightness so that the visibility of the screen can be ensured, and performing an output operation.

Also, as image display devices have different color displaying properties according to the type of products, even the same input signal results in display of different colors on screens according to image display devices. One reason why image display devices have different color properties is that three kinds of light output through the image display devices are different according to the type of products, and color gamuts to be expressible by the image display devices are different. It is the same as a range (i.e. gamut) of expressible mixed colors becoming different depending on which colors the selected primary color dyestuffs have upon painting, on which the present invention is based.

In the description hereinbelow, a mobile terminal includes but is no way limited to, for example, a notebook computer, a cellular phone, a personal communication service terminal, a composite mobile terminal, a camcorder, a game machine, etc., just to name a few possible examples in which the present invention may be arranged. The following description will be given on the assumption that the mobile terminal has a general configuration of the examples.

Figure 1:
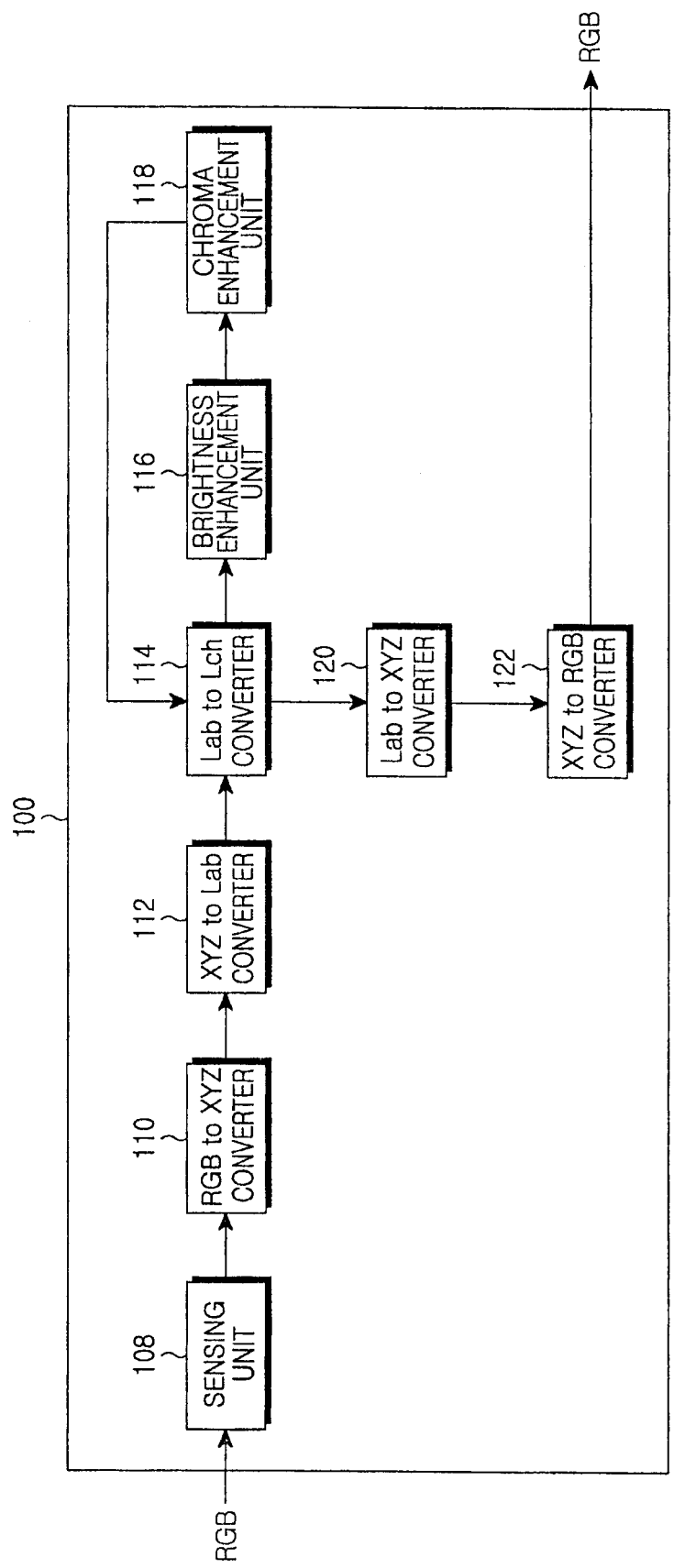
FIG. 1 is a block diagram illustrating the configuration of an apparatus for providing enhanced visibility in a mobile terminal according to an exemplary embodiment of the present invention.

FIG. 1 is a block diagram illustrating one possible configuration of an apparatus for providing enhanced visibility in a mobile terminal according to an exemplary embodiment of the present invention. The apparatus for providing enhanced visibility includes a sensing unit 108, an RGB-to-XYZ converter 110, an XYZ-to-Lab converter 112, an Lab-to-Lch converter 114, a lightness enhancement unit 116, a chroma enhancement unit 118, an Lab-to-XYZ converter 120, and an XYZ-to-RGB converter 122.

First, the sensing unit 108 includes a sensor for measuring an external lightness, which is an ambient brightness of a mobile terminal, wherein when a measured external lightness value is equal to or greater than a preset external brightness value, a visibility adjustment event is generated.

According to the visibility adjustment event generated by the sensing unit 108, the RGB-to-XYZ converter 110 receives an RGB color signal of an image currently displayed on a display screen of the mobile terminal, and converts the received RGB color signal into X, Y, and Z, which are tristimulus values. For example, when the mobile terminal is equipped with an LCD monitor as a display unit, the RGB-to-XYZ converter 110 converts RGB for the LCD monitor into tristimulus values, X, Y, and Z, based on a characterization model of LCD monitors by using equation 1 below.

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix} \quad (1)$$

The tristimulus values acquired by the RGB-to-XYZ converter 110 preferably utilizes a color space which supports standard RGB (sRGB). The sRGB color space is a standard color space which was established in 1996 by the HP company and the MS company, wherein the gamut of the sRGB color space conforms to ITU-R BT. 709, an HDTV standard, the color temperature of the white point is 6500 K, and a gamma is set to 2.2. Although the sRGB color space employed in the present invention is an output for an input to a specific monitor, the specifications of which has been preset, the sRGB color space is suitable for the present invention because it is determined, as a result of a simulation in a mobile terminal, that the sRGB color space is an equivalent coordinate system for vision, and can obtain a considerable effect through conversion.

The XYZ-to-Lab converter 112 converts the tristimulus values, X, Y, and Z, obtained through the conversion by the RGB-to-XYZ converter 110, into Lab color space values (L, a, and b values). The conversion equation is as follows.

$$L^* = 116 \times (Y/Y_n)^{1/3} - 16$$

$$a^* = 500 \times ((X/X_n)^{1/3} - (Y/Y_n)^{1/3})\ X_n Y_n Z_n:$$

$$b^* = 200 \times ((Y/Y_n)^{1/3} - (Z/Z_n)^{1/3})\ \text{white reference stimulus values} \quad (2)$$

The Lab-to-Lch converter 114 converts the L, a, and b values, obtained through the conversion by the XYZ-to-Lab converter 112, into Lch values by using equation 3 below, and outputs the Lch values.

$$C = \sqrt{a^2 + b^2} \quad (3)$$
$$H = \arctan\left(\frac{b}{a}\right)$$

In this case, the L value obtained through the conversion by the XYZ-to-Lab converter 112 is used as the L value of the Lch values.

The brightness enhancement unit 116 adjusts lightness according to L, C, and H values output from the Lab-to-Lch converter 114.

In more detail, a brightness scale from 0 to 100 is divided into ten sections, and an input-to-output function is established as below.

In this case, the user or the mobile terminal may sense the current display state (i.e. brightness of a space in which the terminal is located), and directly select one section of the brightness scale, which is divided, for example, into ten sections, according to the current display state.

Input Point {0, 10, 20, 30, 40, 50, 60, 70, 80, 90, 100}
Output Point {0, 20, 40, 60, 74, 84, 90, 94, 97, 99, 100}

Values between each input point and an output point corresponding to the input point are obtained through linear interpolation, and a middle point between two points, i.e. input and output points, is determined by using (i.e. applying) weights from 0 to 128 preset according to the importance of each value, and the brightness value of the determined middle point is adjusted upward.

In addition, after determining the middle point between input and output points, and adjusting a brightness value, the lightness enhancement unit 116 determines if a hue region, the brightness value of which has been adjusted upward, corresponds to an achromatic region or a chromatic region. When the hue region, and the brightness value of which has been adjusted, corresponds to an achromatic region, the adjusted brightness value is maintained. In contrast, when the hue region, the brightness value of which has been adjusted, corresponds to a chromatic region, the brightness enhancement unit 116 re-adjusts, i.e. downward adjusts, the upward adjusted brightness value because color information of each hue region disappears due to the upward adjustment for the brightness value. In this case, since a brightness value corresponding to the maximum chroma value in each chromatic region is required for the downward adjustment, and each corresponding brightness value is an eigenvalue according to each hue, an eigenvalue corresponding to each hue is stored. Therefore, when the brightness value corresponding to an eigenvalue stored for each hue region is less than the upward adjusted brightness value, the upward adjustment for the brightness of the hue region does not affect the chroma of the hue region. In contrast, when the brightness value corresponding to an eigenvalue is greater than the upward adjusted brightness value, the upward adjusted brightness value reduces the chroma of the hue region. Therefore, in this case, the downward adjustment for the brightness is performed.

With respect to the entire region, the brightness value of which has been adjusted upward, when a hue region corresponds to an achromatic region, the brightness enhancement unit 116 maintains the upward adjusted light value. In contrast, when a hue region corresponds to a chromatic region, the brightness enhancement unit 116 performs a readjustment operation of downward adjusting the upward adjusted brightness value according to the degree of the chroma value of a hue region.

The chroma enhancement unit 118 adjusts the value of chroma (C) of each pixel region, which has been subjected to the adjustment by the brightness enhancement unit 116, preferably by using a transfer function and weights in the same manner as that used to adjust the brightness value in the brightness enhancement unit 116.

That is, a chroma scale from 0 to 100 is divided, for example, into ten sections, and an input-to-output function is established as below.

Input Point {0, 10, 20, 30, 40, 50, 60, 70, 80, 90, 100}
Output Point {0, 20, 40, 60, 74, 84, 90, 94, 97, 99, 100}

Values between each input point and an output point corresponding to the input point are obtained through linear interpolation, a middle point between two points, i.e. input and output points, is determined by using (i.e. applying) weights from 0 to 128 preset according to the importance of each value, and the chroma value of each pixel is adjusted to a corresponding chroma value.

To this end, the chroma enhancement unit 118 determines a middle point between input and output, and calculates the maximum chroma value for each corresponding pixel. Then, the chroma is adjusted according to the maximum color gamut boundary data of each pixel region.

In more detail, the maximum chroma value of each corresponding pixel is calculated using obtained the brightness value and hue value, wherein the maximum chroma value is obtained from gamut boundary data values. The gamut boundary data is used to reduce color difference of images which are output from a display device supporting each color. A normalization operation is performed by making reference to a gamut boundary data value given to each pixel, the chroma value of each pixel is adjusted using a transfer function, and L, C, and H values of each pixel region are output from the chroma enhancement unit 118 to the Lab-to-Lch converter 114.

The Lab-to-Lch converter 114 converts the L, C, and H values of each pixel region received from the chroma enhancement unit 118, into L, a, and b values of the Lab color space, and outputs the L, a, and b values.

The Lab-to-XYZ converter 120 converts the L, a, and b values of each pixel region, received from the Lab-to-Lch converter 114, into tristimulus values, X, Y, and Z.

The XYZ-to-RGB converter 122 generates RGB values from the tristimulus values, X, Y, and Z, received from the Lab-to-XYZ converter 120, and then outputs the RGB values.

Hereinafter, a method for providing enhanced visibility in a mobile terminal according to an exemplary embodiment of the present invention will be described with reference to FIG. 2, and for this example utilizes the aforementioned components of the apparatus for providing enhanced visibility in the mobile terminal.

Figure 2:
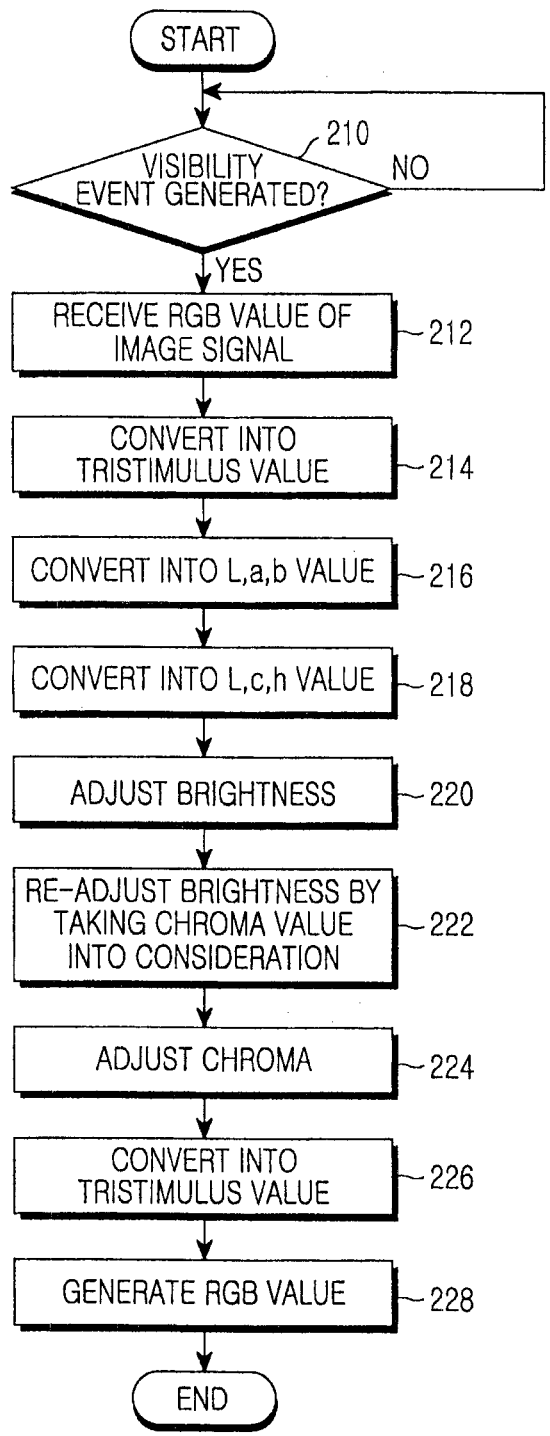
FIG. 2 is a flowchart illustrating exemplary steps of a procedure for a method of providing enhanced visibility in a mobile terminal according to an exemplary embodiment of the present invention.

FIG. 2 is a flowchart illustrating the entire procedure of a method for providing enhanced visibility in a mobile terminal according to an exemplary embodiment of the present invention.

First, in step 210, an external brightness, which is an ambient brightness of a mobile terminal, is measured, and a visibility adjustment event is generated when the measured external lightness value is equal to or greater than a preset external brightness value.

In step 212, an RGB color signal of an image currently displayed on a display screen of the mobile terminal is input according to the visibility adjustment event generated by the sensing unit 108.

In step 214, the input RGB color signal is converted into X, Y, and Z values, which are tristimulus values. That is, when the mobile terminal is equipped with an LCD monitor as a display unit, RGB for the LCD monitor are converted into tristimulus values, X, Y, and Z, based on a characterization model of LCD monitors by using equation 1 shown above.

The tristimulus values acquired in step 214 use a color space which supports standard RGB (sRGB).

In step 216, the converted tristimulus values, X, Y, and Z, are again converted into L, a, and b values of the Lab color space. The conversion equation is the same as equation 2 shown above.

In step 218, the L, a, and b values, obtained through the conversion in step 216, are converted into L, C, and H values by using equation 3 shown above, and then the L, C, and H values are output.

In step 220, lightness is adjusted using the L, C, and H values output in step 218.

In step 222, it is determined whether each pixel region, the brightness value for which has been adjusted in step 220, corresponds to an achromatic region or a chromatic region, and the brightness for each pixel region is readjusted by taking the chroma value of the pixel region into consideration.

Steps 220 and 222 will now be described in more detail with reference to FIG. 3.

Figure 3:
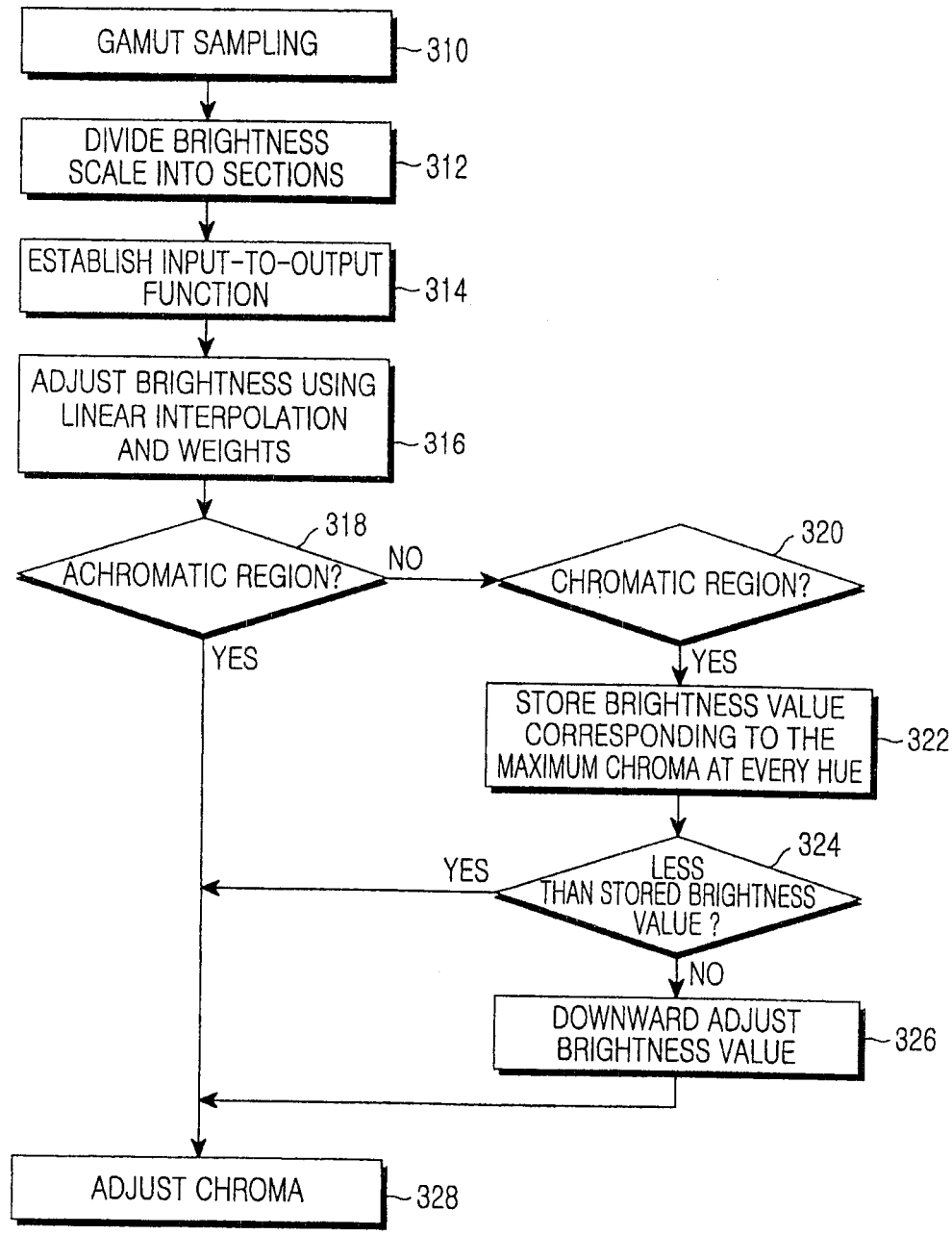
FIG. 3 is a detailed flowchart illustrating exemplary steps of the brightness enhancement operation in the method for providing enhanced visibility in a mobile terminal according to an exemplary embodiment of the present invention.

FIG. 3 is a detailed flowchart illustrating the brightness enhancement operation in the method for providing enhanced visibility in a mobile terminal according to an exemplary embodiment of the present invention. First, a gamut sampling is performed from among respect to the full color gamut of a corresponding display of the mobile terminal in step 310. The sampling is performed because using the full color gamut requires a large storage space in the mobile terminal. Then, a brightness scale from 0 to 100 is divided, for example, into ten sections in step 312, and an input-to-output function is established as below in step 314.

Input Point {0, 10, 20, 30, 40, 50, 60, 70, 80, 90, 100}
Output Point {0, 20, 40, 60, 74, 84, 90, 94, 97, 99, 100}

Values between each input point and an output point corresponding to the input point are obtained through linear interpolation, a middle point between two points, i.e. input and output points, is determined by using (i.e. applying) weights preset according to the importance of each value, and the brightness value of each pixel region is adjusted in step 316.

It is determined if each pixel region, in which the brightness value has been adjusted in step 316, now corresponds to an achromatic region (step 318) or a chromatic region (step 320). When the pixel region, in which the brightness value has been adjusted, corresponds to an achromatic region, the adjusted brightness value is maintained.

In contrast, when the pixel region, in which the brightness value has been adjusted, corresponds to a chromatic region (step 320), the brightness value upward adjusted in step 316 must be re-adjusted, i.e. adjusted downward, because color information of the pixel region disappears due to the upward adjustment for the brightness value. In this case, since a brightness value corresponding to the maximum chroma value in each pixel region of the chromatic region is required for the downward adjustment, and each corresponding brightness value is an eigenvalue according to each hue, an eigenvalue corresponding to each hue is stored in step 322.

Still referring to FIG. 3, it is determined in step 324 whether the brightness value corresponding to an eigenvalue stored for each hue region is less than the upward adjusted lightness value. The brightness value of the corresponding pixel is adjusted downward in step 326 when the corresponding brightness value is equal to or greater than the upward adjusted brightness value, and the brightness value of the corresponding pixel is maintained when the corresponding brightness value is less than the upward adjusted brightness value. The reason for this adjustment is because the chroma of the corresponding pixel region is reduced due to the upward adjustment of the brightness in step 316. Finally, at step 328, there is a chroma value adjustment.

A following processing operation for each pixel region, the brightness of which has been adjusted by the brightness enhancement operation performed in steps 310 to 326 of FIG. 3, and will now be described with reference to FIG. 2. In step 224, the chroma value of each pixel region is adjusted using a transfer function and weights in the same manner as the brightness adjustment procedure performed in steps 310 to 326.

That is, a chroma scale from 0 to 100 is divided, for example, into ten sections, and an input-to-output function is established as below.

Input Point {0, 10, 20, 30, 40, 50, 60, 70, 80, 90, 100}
Output Point {0, 20, 40, 60, 74, 84, 90, 94, 97, 99, 100}

Values between each input point and an output point corresponding to the input point are obtained through linear interpolation, a middle point between two points, i.e. input and output points, is determined by using (i.e. applying) weights from 0 to 128 preset according to the importance of each value, and the chroma value of each pixel is adjusted to a corresponding chroma value.

To this end, a middle point between the input and output is determined, and the maximum chroma value for each corresponding pixel is calculated. This is based on the maximum gamut boundary data of each pixel region.

In detail, the maximum chroma value of each corresponding pixel is calculated using obtained brightness value and hue value, wherein the maximum chroma value is obtained from gamut boundary data values. A normalization operation is performed by making reference to a gamut boundary data value given to each pixel, the chroma value of each pixel is adjusted using a transfer function, and then the resultant values are output to the Lab-to-Lch converter 114.

In step 226, L, C, and H color space values of each pixel region, which has been output in step 224, are converted into L, a, and b values, and then the L, a, and b values are again converted into tristimulus values, X, Y, and Z.

In step 228, new RGB values are generated using the tristimulus values, X, Y, and Z, and are then output.

Therefore, the present invention provides a screen display apparatus and method of measuring an ambient brightness by adjusting color quality of an output screen in a mobile terminal according to the ambient brightness so that the visibility of the screen can be ensured, and performing an output operation.

The apparatus and method for providing enhanced visibility in a mobile terminal according to an exemplary embodiment of the present invention may be implemented as described in the above examples. While the present invention has been shown and described with reference to certain exemplary embodiments thereof, it will be understood by those skilled in the art that various changes in form and details may be made therein without departing from the spirit and scope of the invention as defined by the appended claims. For examples, while the specification discloses brightness and chroma scales from 0 to 100 and their division into ten sections, it is within the spirit and scope of the claimed invention that such values can be varied. Accordingly, the scope of the invention is not to be limited by the above exemplary embodiments but by the claims and the equivalents thereof.

What is claimed is:

1. A method for providing enhanced visibility in a mobile terminal, the method comprising:
   (a) automatically without user intervention measuring by a sensing unit an external brightness ambient to a mobile terminal and generating by the sensing unit a visibility adjustment event when a measured ambient brightness value is equal to or greater than a predetermined specific external brightness value;
   (b) receiving a Red, Green, Blue (RGB) signal of an image currently displayed on a display screen of the mobile terminal according to the generated visibility adjustment event;
   (c) converting the received RGB signal into first tristimulus values;
   (d) converting the first tristimulus values into first lightness (L), red-greenness "a", yellow-blueness "b" color space values;
   (e) converting the first L, a, b color space values into lightness (L), chroma (C), and hue (H) values using a predetermined equation;
   (f) adjusting brightness of an entire region of the image which is output on the display screen of the mobile terminal without a user comparison or user selection regarding an extent to which the brightness is adjusted, and adjusting chroma of each pixel region by using the L, C, and H values from step (e);
   (g) converting L, C, and H values of each pixel region, the lightness and chroma of which have been adjusted in step (f), into second L, a, b color space values, and converting the second L, a, b color space value into second tristimulus values; and
   (h) generating an RGB signal using the second tristimulus values;
   Wherein the step of adjusting brightness in step (f) comprises:
   When a region, a brightness value of which has been adjusted, corresponds to a chromatic region, comparing a predetermined brightness value corresponding to a color of each pixel region included in the chromatic region and the adjusted brightness value of the each pixel region, adjusting the adjusted brightness value downward when the predetermined brightness value is greater than the adjusted brightness value, and maintaining the adjusted brightness value when the predetermined brightness value is equal to or less than the adjusted brightness value.

2. The method as claimed in claim 1, further comprising: determining whether said each pixel region, the brightness of which has been adjusted, corresponds to an achromatic region or a chromatic region, and downwardly adjusting the adjusted brightness value when said pixel region corresponds to the chromatic region.

3. The method as claimed in claim 1, wherein the step of conversion into the first tristimulus values (X,Y,Z) is performed in accordance with the following equation:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix}.$$

4. The method as claimed in claim 1, wherein the conversion in step (d) into the first L, a, b color space values is performed in accordance with the following equation:

$$L^* = 116 \times (Y/Y_n)^{1/3} - 16$$

$$a^* = 500 \times ((X/X_n)^{1/3} - (Y/Y_n)^{1/3}) \, X_n Y_n Z_n;$$

$$b^* = 200 \times ((Y/Y_n)^{1/3} - (Z/Z_n)^{1/3}) \text{ white reference stimulus values.}$$

5. The method as claimed in claim 1, wherein, the conversion in step (e) into the L, C, and H values, the L value of the L, C, and H values is acquired from the L value of the first L, a, b color space values, and the C and H value are acquired in accordance with the following:

$$C = \sqrt{a^2 + b^2}$$

$$H = \arctan\left(\frac{b}{a}\right).$$

6. The method as claimed in claim 1, wherein the tristimulus values use a color space which supports standard RGB (sRGB).

7. The method as claimed in claim 1, wherein the step of adjusting brightness in step (f) comprises:
   (i) performing a sampling from among a full color gamut of a corresponding display of the mobile terminal;
   (ii) dividing a brightness scale into sections, and establishing an input-to-output function; and
   acquiring values between each input point and an output point corresponding to the input point through linear interpolation, determining a middle point between two points by using weights, and adjusting the brightness value of each pixel region.

8. The method as claimed in claim 1, wherein the brightness scale from 0 to 100 is divided into ten sections, and the established input-to-output function comprises:
   Input Point {0, 10, 20, 30, 40, 50, 60, 70, 80, 90, 100}
   Output Point {0, 20, 40, 60, 74, 84, 90, 94, 97, 99, 100}; and
   wherein the middle point is determined using weights determining a middle point between two points by using weights from 0 to 128.

9. The method as claimed in claim 1, wherein the adjusting chroma of said each pixel region comprises:
   (i) dividing a chroma scale into sections, and establishing an input-to-output function:
   Input Point {0, 10, 20, 30, 40, 50, 60, 70, 80, 90, 100}
   Output Point {0, 20, 40, 60, 74, 84, 90, 94, 97, 99, 100};
   (ii) acquiring values between each input point and an output point corresponding to the input point through linear interpolation, determining a middle point between two points by using weights from 0 to 128, normalizing the middle point by making reference to the maximum gamut boundary data of each pixel, and calculating the maximum chroma value of each pixel of said each pixel region by using a transfer function; and
   (iii) comparing the calculated maximum chroma value with a chroma value of a current pixel, and adjusting chroma.

10. The method as claimed in claim 9, wherein the chroma scale ranges from 0 to 100, and the sections comprise ten sections, and the input-to-output function is established according to input and output points, wherein:
Input Point {0, 10, 20, 30, 40, 50, 60, 70, 80, 90, 100}; and
Output Point {0, 20, 40, 60, 74, 84, 90, 94, 97, 99, 100}.

11. An apparatus for providing enhanced visibility in a mobile terminal, the apparatus comprising:
- a sensing unit that automatically without user intervention measures an external brightness ambient to a mobile terminal, and automatically generating a visibility adjustment event when a measured ambient lightness value is equal to or greater than a preset specific brightness value;
- a Red, Green, Blue (RGB)-to-XYZ converter for receiving an RGB signal of an image displayed on a display screen of the mobile terminal, and converting the received RGB signal into first tristimulus values (X, Y, Z);
- an XYZ-to-Lab converter for converting the first tristimulus values into lightness (L), red-greenness "a", yellow-blueness "b" color space values
- an Lab-to-LCH converter for converting the L, a, b color space values into lightness (L), chroma (C), and hue (H) values;
- a brightness enhancement unit for adjusting brightness of an entire region of the image output on the display screen, by using the L, C, and H values image which is output on the display screen of the mobile terminal without a user comparison or user selection regarding an extent to which the brightness is adjusted;
- a chroma enhancement unit for adjusting chroma of each pixel region of the image, the lightness of which has been adjusted, and outputting the image to the Lab-to-LCH converter;
- a Lab-to-XYZ converter for converting L, C, and H values of each pixel region, the lightness and chroma of which have been adjusted, into second tristimulus values; and
- an XYZ-RGB converter for generating an RGB signal using the second tristimulus values,
- wherein when a region, a brightness value of which has been adjusted, corresponds to a chromatic region, the brightness enhancement unit compares a predetermined brightness value of each pixel region included in the chromatic region and the adjusted brightness value of the each pixel region, adjusts the adjusted brightness value downward when the predetermined brightness value is greater than the adjusted brightness value, and maintains the adjusted brightness value when the predetermined brightness value is equal to or less than the adjustment brightness value.

12. The apparatus according to claim 11, wherein
the RGB-to-XYZ converter converts the received RGB signal into first tristimulus values (X, Y, Z) according to:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix}.$$

13. The apparatus according to claim 11, wherein the XYZ-to-Lab converter converts the first tristimulus values into L, a, b color space values according to:

$$L^* = 116 \times (Y/Y_n)^{1/3} - 16$$

$$a^* = 500 \times ((X/X_n)^{1/3} - (Y/Y_n)^{1/3}) X_n Y_n Z_n:$$

$$b^* = 200 \times ((Y/Y_n)^{1/3} - (Z/Z_n)^{1/3})$$ white reference stimulus values.

14. The apparatus according to claim 11, wherein the Lab-to-LCH converter converts the L, a, b color space values into lightness (L), chroma (C), and hue (H) values according to:

$$C = \sqrt{a^2 + b^2}$$

$$H = \arctan\left(\frac{b}{a}\right)$$

(wherein the L value of the L, C, and H values is obtained from among the L, a, b color space values).

15. The apparatus as claimed in claim 11, wherein the brightness enhancement unit performs a sampling from among a full color gamut of a corresponding display of the mobile terminal, divides a brightness scale into sections, establishes an input-to-output function, and acquires values between each input point and an output point corresponding to the input point through linear interpolation, determines a middle point between two points by using weights from 0 to 128, and adjusts a lightness value of each pixel region.

16. The apparatus as claimed in claim 15, wherein the brightness enhancement unit divides the brightness scale from 0 to 100 and the sections comprise ten sections.

17. The apparatus as claimed in claim 16, wherein the input-to-output function is established according to the following input and output points:
Input Point {0, 10, 20, 30, 40, 50, 60, 70, 80, 90, 100}
Output Point {0, 20, 40, 60, 74, 84, 90, 94, 97, 99, 100}.

18. The apparatus as claimed in claim 11, wherein the chroma enhancement unit divides a chroma scale from into sections, establishes an input-to-output function:
Input Point {0, 10, 20, 30, 40, 50, 60, 70, 80, 90, 100}
Output Point {0, 20, 40, 60, 74, 84, 90, 94, 97, 99, 100}, and
acquires values between each input point and an output point corresponding to the input point through linear interpolation, determines a middle point between two points by using weights from 0 to 128, normalizes the middle point by making reference to the maximum gamut boundary data of each pixel, calculates the maximum chroma value of each pixel by using a transfer function, compares the calculated maximum chroma value with a chroma value of a current pixel, and adjusts chroma.

19. The apparatus as claimed in claim 18, wherein the chroma scale range from 0 to 100 and said sections comprise ten sections, and
wherein the input-to-output function is established according to the following input and output points:
Input Point {0, 10, 20, 30, 40, 50, 60, 70, 80, 90, 100}
Output Point {0, 20, 40, 60, 74, 84, 90, 94, 97, 99, 100}.

* * * * *

UNITED STATES PATENT AND TRADEMARK OFFICE
CERTIFICATE OF CORRECTION

PATENT NO. : 8,416,254 B2
APPLICATION NO. : 12/348930
DATED : April 9, 2013
INVENTOR(S) : Jong-Man Kim et al.

Page 1 of 1

It is certified that error appears in the above-identified patent and that said Letters Patent is hereby corrected as shown below:

In the Claims

Column 11, Claim 11, Line 23 should read as follows:
--...chroma (C), and hue (H)...--

Column 12, Claim 18, Lines 40-41 should read as follows:
--...a chroma scale into sections...--

Signed and Sealed this
Twenty-first Day of May, 2013

Teresa Stanek Rea
*Acting Director of the United States Patent and Trademark Office*